United States Patent [19]

Kato

[11] 4,386,689

[45] Jun. 7, 1983

[54] TORQUE LIMITER

[76] Inventor: Taizo Kato, 3007-104 Kobatahigashijima, Moriyama-ku, Nagoya 463, Japan

[21] Appl. No.: 211,052

[22] Filed: Nov. 28, 1980

[30] Foreign Application Priority Data

Aug. 27, 1980 [JP] Japan ................... 55-118821
Sep. 6, 1980 [JP] Japan ................... 55-123832

[51] Int. Cl.³ .................. F16D 7/06; F16D 43/20
[52] U.S. Cl. ................... 192/56 R; 408/139; 464/36; 464/37
[58] Field of Search .............. 192/56 R; 464/35, 36, 464/38, 37; 10/89 H, 135 R, 141 H; 408/139; 81/474

[56] References Cited

U.S. PATENT DOCUMENTS

| 2,684,491 | 7/1954 | Roddick | 408/139 |
| 2,775,327 | 12/1956 | Gearhart | 192/56 R |
| 2,791,433 | 5/1957 | Dodd | 279/79 |
| 3,827,260 | 8/1974 | Kato | 64/29 |
| 3,835,973 | 9/1974 | Braggins et al. | 192/56 R |
| 3,893,553 | 7/1975 | Hansen | 464/36 X |
| 4,006,608 | 2/1977 | Vuceta | 464/36 X |

FOREIGN PATENT DOCUMENTS

| 1270371 | 6/1968 | Fed. Rep. of Germany . |
| 462587 | 4/1937 | United Kingdom . |
| 745370 | 2/1956 | United Kingdom . |
| 2023031 | 12/1979 | United Kingdom . |
| 2036890 | 7/1980 | United Kingdom . |

*Primary Examiner*—Rodney H. Bonck
*Attorney, Agent, or Firm*—Merriam, Marshall & Bicknell

[57] ABSTRACT

This disclosure relates to a torque limiter for use in connecting a rotational drive to a part to be driven. The limiter includes a drive member adapted to be connected to the drive, a driven member adapted to be connected to the part and rotatable relative to the drive member, a clutch roller connected to the drive member and movable to an engaged position where it couples the drive and driven members and to a disengaged position where the driven member is uncoupled from the drive member, the driven member producing a reaction force on said clutch roller during the application of torque which tends to move the clutch roller to the disengaged position, a clutch member that is angularly movable relative to the drive member and is engageable with the clutch roller, the clutch member being angularly movable to a first position where it moves the clutch roller to its engaged position and to a second position where it permits the clutch roller to move to the disengaged position due to the reaction force, and adjustable force means connecting the clutch member to the drive member and tending to move the clutch member to the first angular position. At the upper torque limit, the reaction force is high enough that it overcomes the force means and moves the clutch member to the second position and the clutch roller to the disengaged position.

6 Claims, 11 Drawing Figures

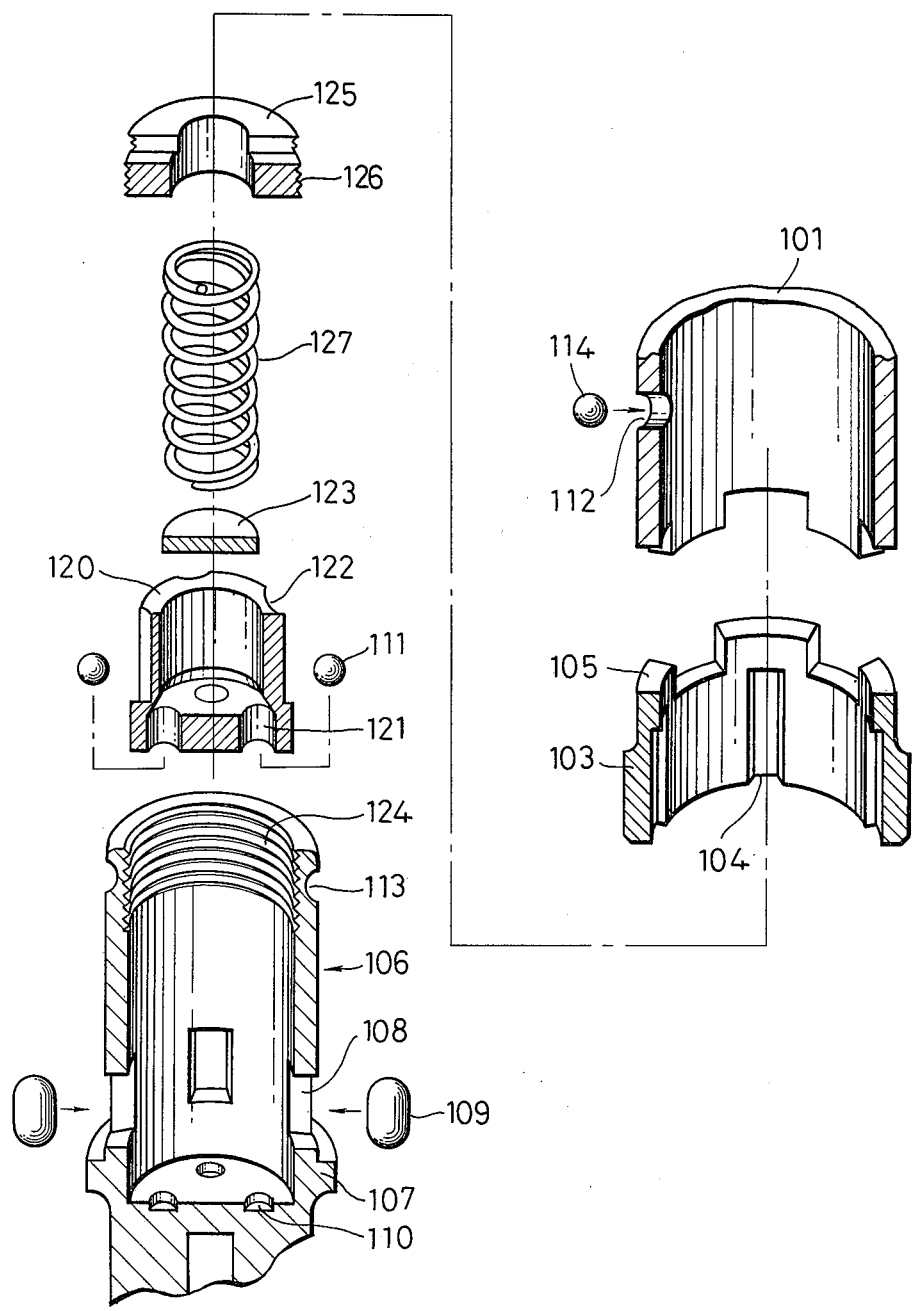

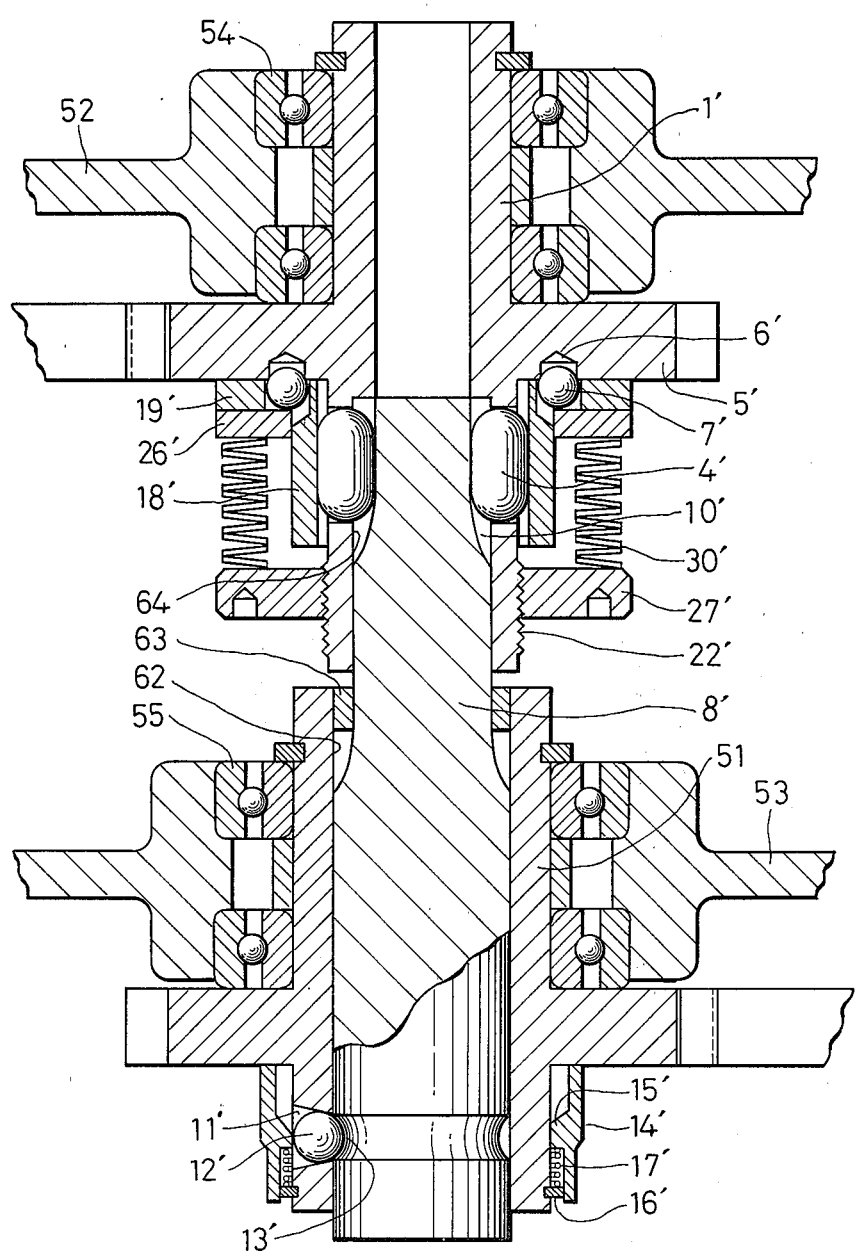

TORQUE LIMITER

DETAILED DESCTIPTION

This invention relates to a torque transmission mechanism for coupling rotational members in driving relation, and particularly to such a mechanism including torque limiter for uncoupling or disconnecting the members from each other when the driven member encounters a torque overload greater than a predetermined torque.

An example of a torque transmission mechanism is a tapping spindle or tap holder designed to transmit the rotation of the drive shaft to the socket shaft connected to the tap. If the transmission of rotation is continued after the tap encounters an overload during the tapping operation, the spindle as well as the work may be damaged.

Examples of conventional torque limiters in tapping spindles include:

1. friction and disc clutches;
2. clutches as examplified in U.S. Pat. No. 2,791,433 and British Pat. No. 745,370 wherein keys or rollers are radially urged by resilient rubber to normally engage both rotational members but which can disengage from one of the two members against the resilience when an overload is encountered;
3. clutches as exemplified in the inventor's U.S. Pat. No. 3,827,260, wherein balls are spring-urged in a radial direction to normally engage two rotational members but which can disengage from one of the members when an overload is encountered.

Such conventional clutches hve the following disadvantages:

Clutches as mentioned in paragraph (1) above have friction surfaces, and the relative coefficient of friction between them changes as the surfaces slide, preventing the limit of transmitted torque from being predetermined. Also, the surfaces wear in a relatively short time.

Clutches as mentioned in paragraph (2) above utilize resilient rubber by which the precise limit of transmitted torque cannot be predetermined. Also, rubber is not durable.

Clutches as mentioned in paragraph (3) above utilize balls which can engage the parts only on points (not along lines) and they wear in a relatively short time, and also they can transmit only low torque values.

It is a general object of this invention to provide a durable torque limiter wherein the limit of rotational torque transmitted from a driving member to a driven member may be easily adjusted.

It is a further object of this invention to provide a torque limiter for use in connecting a rotational drive to a part to be driven, the limiter including a drive member adapted to be connected to the drive, a driven member adapted to be connected to the part and rotatable relative to the drive member, a clutch roller connected to the drive member and movable to an engaged position where it couples the drive and driven members and to a disengaged position where the driven member is uncoupled from the driven member, the driven member producing a reaction force on said clutch roller during the application of torque which tends to move the clutch roller to the disengaged position, a clutch member that is angularly movable relative to the drive member and is engageable with the clutch roller, the clutch member being angularly movable to a first position where it moves the clutch roller to its engaged position and to a second position where it permits the clutch roller to move to the disengaged position due to the reaction force, and adjustable force means connecting the clutch member to the drive member and tending to move the clutch member to the first angular position.

The invention will be explained in detail by way of examples of the invention, with reference to the accompanying drawings, wherein:

FIG. 6 is an exploded view of the parts shown in FIG. 5;

FIG. 9 is a side view similar to FIGS. 1 and 5 but showing a third embodiment in its normal position.

Reference is first made to FIGS. 1-4 showing the first embodiment as applied to a tapping spindle.

Figure 2A:
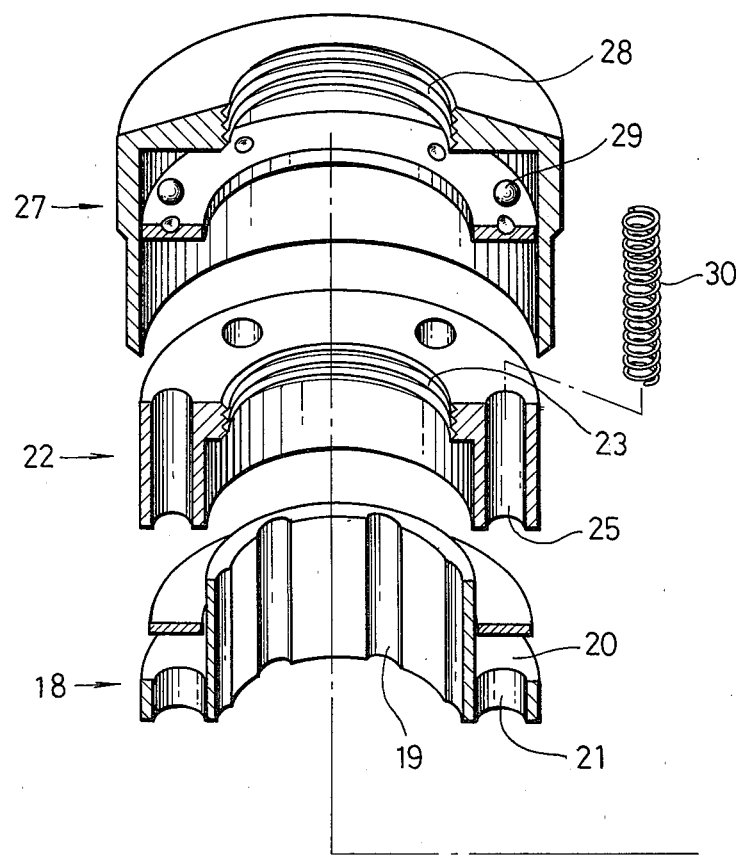
FIGS. 2A and 2B are exploded views of the parts shown in FIG. 1.
Figure 2:
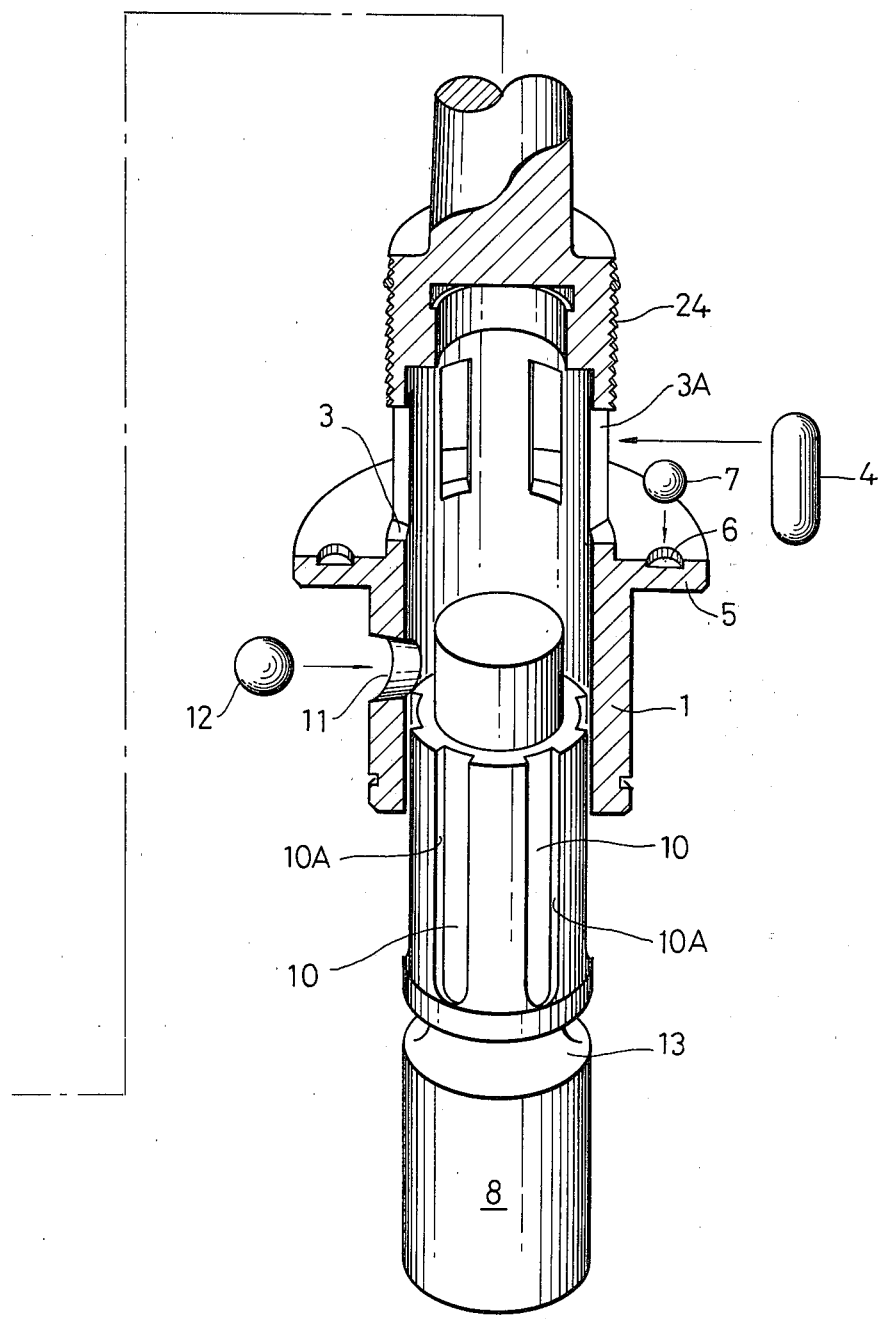

A spindle or driving member 1 has a cylindrical portion open at its lower or one end and a shank 2 on the other end. The cylindrical portion has at least one, and preferably a number of axial slots 3 formed through its side wall at regular angular intervals. Each slot 3 has a width through which a clutch roller 4 can move radially, but both of its edges should be angled or tapered for inward convergence to hold the roller 4 from falling radially inward. The angled edges are indicated at 3A in FIGS. 2B and 3. The driving member 1 further has an outer flange 5 formed on the outside of the cylindrical portion. The flange has at least one and preferably a plurality of angularly spaced axial recesses 6 formed in its upper side.

A tap holder or socket shaft 8, to which a tap (not shown) may be attached at the lower end of the holder 8, is telescoped within the cylindrical portion of the spindle 1 and rotatable relative thereto. The holder 8 has axially extending outer grooves 10 formed in its upper peripheral portion at the same angular intervals as the slots 3. Each groove 10 is open at its upper end (see FIG. 2B) and it preferably has radial sides 10A.

The holder 8 is rotatably attachable to the driving member 1 by chuck means including at least one hole 11 formed through the lower cylindrical wall of the member 1, a peripheral groove 13 formed in the holder 8, a ball 12 positioned in the hole 11 and the groove 13, and a ball keeper 14 reciprocatably surrounding the lower wall portion of the member 1 and generally spaced radially therefrom.

The keeper 14 has an interior annular ridge 15 and it is urged upwardly by a spring 17 between the ridge 15 and a stop ring 16 that is secured to the lower outer wall of the member 1. The ridge 15 normally overlies the ball 12 and normally keeps the ball 12 within the hole 11 and groove 13 when the upper end of the keeper 14 engages the flange 5 of the member 1, so that the holder 8 is axially fixed relative to the spindle 1 and its top end engages the inner end of the spindle. The sides of the hole 11 should be narrowed at its radially inner end so as to prevent the ball 12 from falling radially inwardly when the tool holder 8 is detached from the member 1.

When the keeper 14 is pulled downwardly against the force of the spring 17 to cause the ridge 15 to move away from the ball 12, the ball can move radially out of the groove 13 and into the space within the keeper 14, and the holder 8 is now detachable from the driving member 1.

A tubular or annular clutch member 18 surrounds the slots 3 of the driving member 1 and is rotatable relative thereto. The member 18 has axial grooves 19 (see FIGS. 1 and 2A) formed in its inner wall at angular intervals which are the same as the intervals of the slots 3 of the driving member 1 and of the grooves 10 of the holer 8. The tubular member 18 further has an outer flange 20 formed at its lower end, which rotatably engages the flange 5 of the driving member 1, and it has axial holes 21 formed therethrough at the same angular intervals as the recesses 6 of the flange 5.

Another tubular member 22 surrounds an upper portion of the tubular member 18 and has an upper, radially inward extension formed with an interior thread 23 (FIG. 2A) for engagement with an exterior thread 24 formed in the driving member 1 above the slots 3, thereby holding the member 18 axially relative to the slots 3 but rotatable relative thereto. The tubular member 22 further has at least one, and preferably a plurality of axial holes 25 formed therethrough.

A ball 7 (FIG. 1) is placed in each hole 21 of the member 18 in engagement with each recess 6 of the member 1, and a washer or ring 26 is placed over the balls 7.

An adjusting cover 27 positioned around the member 1 has an upper, interior thread 28 in engagement with the outer thread 24 of the driving member 1, and it covers the tubular member 22 and the ring 26. A stop ring 31 is fastened to the thread 24 of the driving member 1 to prevent the cover 27 from being threaded upwardly relative to the member 1. A thrust bearing 29 is provided at the inward end of the cover 27.

A compression spring 30 extends through each hole 25 of the tubular member 22 between the bearing 29 and the ring 26. The springs 30 urge the balls 7 into the recesses 6 so that each ball 7 engages both one of the holes 21 and one of the recesses 6, thus bringing the holes 21 and the recesses 6 into angular alignment.

Each clutch roller 4 has a diameter sufficiently larger than the thickness of the cylindrical wall of the driving member 1, that it engages both one of the slots 3 and one of the grooves 19 of the member 18 and it can engage one of the grooves 10 of the holder 8.

It is essential that the angular relation among the slots 3, grooves 19, recesses 6 and holes 21 and the sizes of them and the grooves 10, rollers 4 and balls 7 be such that, when the recesses 6 are in alignment with the holes 21 (FIG. 3), the grooves 19 are displaced by a small angle from the slots 3, forcing the rollers 4 away from the grooves 19 and into the grooves 10 of the tap holder 8 but holding the rollers 4 in engagement within the grooves 19. On the other hand, when the slots 3 are in alignment with grooves 19 (FIG. 4), the holes 21 are displaced from the recesses 6, thereby forcing the balls 7 upwardly away from the recesses 6 against the force of the springs 30 but keeping the balls still in engagement within the recesses 6. In the FIG. 4 position, the rollers 4 are moved radially outwardly from the grooves 10 and the holder 8 can turn relative to the member 1.

Figure 3:
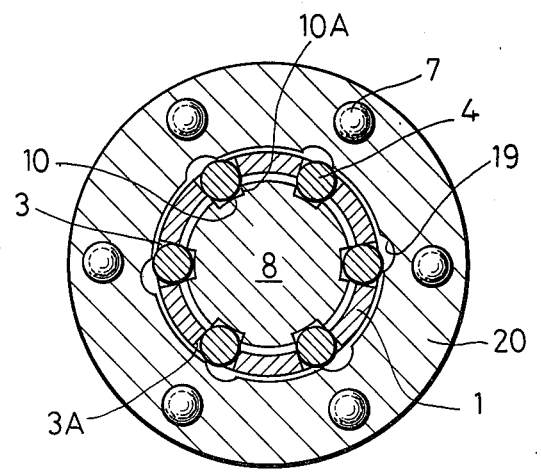
FIG. 3 is a cross-sectional view taken on line III—III of FIG. 1.

In operation:

Normally (FIGS. 1 and 3), the spring-urged balls 7 force the holes 21 to align with the recesses 6, causing the edges of the inner grooves 19 to expel or move the rollers 4 into the outer grooves 10 which are aligned angularly with the slots 3. The spindle 1 is then rotated in one direction to drive the tap holder 8 through the rollers 4. As shown in FIG. 3, the edges or corners 10A of the slots 10 engage a relatively short arc, which is substantially less than 180°, on the radially inner side of the rollers. When the member 3 is driven by a machine (not shown) attached to the shank 2, there is a drive connection from the member 1 to the rollers 4 and to the shaft 8. The reaction force of the shaft 8 tends to move the rollers 4 radially outwardly but the corners of the grooves 19 of the member 18 normally hold the rollers 4 in the grooves 10. As shown in FIG. 3, the corner of each groove 19 that engages the associated roller 4 is slightly angularly offset from a radial line passing through the center of the roller 4, and as a result, the above-mentioned outward force on the roller produces a force component tending to angularly move the member 18 relative to the roller 4 and the member 1. The balls 7 and the springs 30 normally prevent this angular movement.

Figure 4:
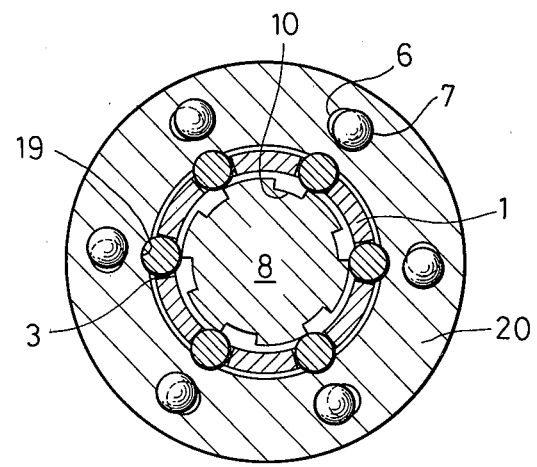
FIG. 4 is a cross-sectional view similar to FIG. 3 but showing different positions of the parts.
Figure 5:
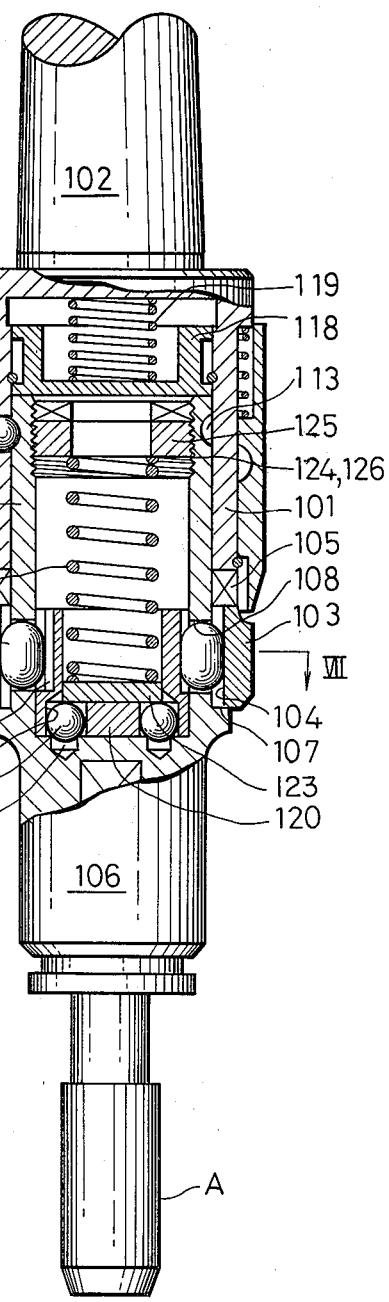
FIG. 5 is a side view similar to FIG. 1 but showing a second embodiment in its normal position.

When the load torque on the holder 8 exceeds a predetermined torque value, the rollers 4 are forced by the reaction force out of the grooves 10 (FIG. 4), allowing the spindle or member 1 to idle and the holder 8 to stop rotating. The rollers 4 press the edges of the grooves 19 with sufficient force to rotate the tubular member 18 relative to the spindle 1 until the grooves 19 are aligned with the slots 3 and then the rollers move into the grooves 19 and out of the grooves 10, allowing the member 1 to rotate relative to the member 8. The angular movement causes the holes 21 of the tubular member 18 to be displaced from the recesses 6 of the flange 5 of the driving member 1, lifting the balls 7 upwardly away from the recesses 6 against the force of the springs 30. The balls 7, however, only move a small angle because the rollers 4 move to the bottom of the grooves 19, and then the balls 7 are held on the edges of the recesses 6 as shown in FIG. 4. The springs 30 tend to move the balls 7 back completely into the recesses 6.

When the load torque later drops and becomes lower than the predetermined value, the force of the springs 30 pressing the balls 7 always in engagement with both the holes 21 and the recesses 6 then causes the parts to return to the position of FIG. 3.

The predetermined torque mentioned above may be adjusted by turning the adjusting cover 27 relative to the spindle 1 to change the compressive force of the springs 30 and/or by replacing the tap holder 8 with a different one having a different diameter or grooves 10 of different sizes. Other torques may be needed for different materials being worked, different diameters of holes to be tapped, etc.

Figure 7:
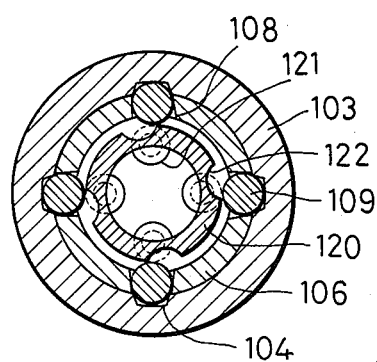
FIG. 7 is a cross-sectional view on line VII—VII of FIG. 6.
Figure 8:
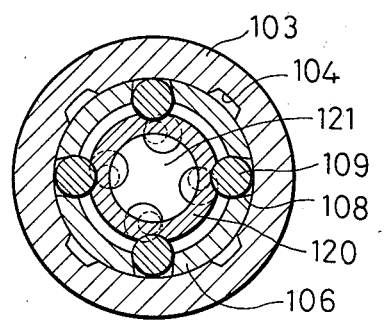
FIG. 8 is a cross-sectional view similar to FIG. 7 but showing different positions of parts.

FIGS. 5–8 show the second embodiment of the invention as also applied to a tapping spindle. A driving member 101 has a cylindrical portion that is hollow or open at its lower end and a shank 102 on its other end. An annular member 103, which may instead be formed integrally with the member 101, has at least one tooth 105 at its upper end for detachably connecting it with teeth on the lower end of the member 101 so that they rotate together. The annular member 103 further has at least one, and preferably a number, of axial inner grooves 104 in it that are open at the lower ends and are formed on the inner periphery at angularly regular intervals. Each groove 104 preferably has inwardly divergent edges as shown in FIG. 7.

A tap holder or driven member 106 has a socket at one end for attachment with a tap A and a cylindrical portion that is open at its other end and telescoped within the cylindrical open portion of the spindle 101 for relative rotation. The driven member 106 has an outer radial step 107 on which the lower end of the annular member 103 rests for engagement with the driving member 101, and axial slots 108 are formed through the cylindrical wall at the same intervals as the grooves 104.

A clutch roller 109 has a diameter substantially larger than the thickness of the cylindrical wall of the driven member 106 and is positioned within each slot 108 and is radially movable therethrough. Both edges of each slot should be angled for outward convergence in order to hold the roller from falling radially outward. The driven member 106 further has at least one, and preferably a number of, axial recesses 110 formed in its inner end at angular intervals, the axis of each recess being eccentric or offset from the axis of the member 106.

The driven member 106 can be detachably attached to the driving member 101 by chuck means including at least one radial hole 112 formed through the cylindrical wall of the spindle 101, an annular groove 113 formed in the outer periphery of the cylindrical portion of the holder 106 at an upper portion thereof, and a ball 114 located within the hole 112 and movable therethrough.

The chuck means further includes a sleeve 115 surrounding the cylindrical portion of the spindle 101 around the level of the hole 112, the sleeve 115 being reciprocatable relative thereto and having an annular groove 117 formed in its inner wall. The sleeve 115 is biased downwardly relative to the spindle 101 by a spring 116, and its downward movement is limited by a stop ring so that its groove 117 is normally displaced downwardly from the hole 112.

The chuck means still further includes an annular ball receiver 118 reciprocatable within the driving member 101 above the driven member 106. The receiver is biased by a spring 119 to normally rest against the top of the driven member 106 when attached.

Normally, when the driven member 106 is attached to the driving member 101 with the annular groove 113 aligned with the hole 112 (FIG. 5), the ball 114 engages both the groove 113 and the hole 112 to fix the driven member 106 axially but rotatably relative to the driving member 101. In order to detach the holder 106 from the spindle 101, the sleeve 115 is moved relative to the spindle against the force of the spring 116 until the annular groove 117 is aligned with the hole 112. The ball 113 can then move radially outwardly from the annular groove 113 of the driven member 106 into the annular groove 117 of the sleeve 115 so that the member 106 is detachable. When detached, the receiver 118 follows the driven member 106 in order to receive the ball 114, the downward movement of the receiver 118 being stopped by a stop ring. When the driven member 106 is detached, the annular member 103 is then detachable.

Another tubular or annular clutch member 120 is reciprocatable within the cylindrical portion of the holder 106 and is open at its upper end. The member 120 has a bottom formed with axial holes 121 at positions corresponding to the recesses 110 of the holder 106, and a cylindrical wall formed with axial grooves 122 in the outer periphery at the same intervals as the slots 108 of the driven member 106.

A ball 111 is located in each hole 121 of the annular member 120 over the associated recess 110. A washer 123 is placed within the member 120 over the balls 111. The driven member 106 has an interior thread 124 formed in its upper cylindrical wall, into which an adjuster 125 is threaded by its outer threads 126. A compression spring 127 extends between the adjuster 125 and the washer 123, and urges the balls 111 to engage both the holes 121 and recesses 110 so that the holes 121 are angularly aligned with the recesses 110.

Each clutch roller 109 movably engages one of the slots 108 and one of the outer grooves 122, and it is engageable with one of the inner grooves 104.

It is essential that the angular relation among the slots 108, the grooves 122, the recesses 110 and the holes 121 and the sizes of them and the grooves 104, the rollers 109 and the balls 111 are such that, when the recesses 110 are in alignment with the holes 121 (FIG. 7), the grooves 122 are displaced by a small angle from the slots 108, forcing the rollers 109 away from the grooves 122 into the grooves 104 of the annular member 103 but holding the rollers 109 in engagement within the grooves 122. On the other hand, when the slots 108 are in alignment with grooves 122 (FIG. 8), the holes 121 are displaced from the recesses 110, forcing the balls 111 away from the recesses 110 against the force of the spring 127 but keeping the balls still in engagement within the recesses 110.

In operation, normally (FIGS. 5 and 7), the spring-urged balls 111 force the holes 121 to align with the recesses 110, causing the edges of the outer grooves 122 to expel the rollers 109 into the inner grooves 104 which are aligned angularly with the slots 108. The spindle 101 is then rotated in one direction to drive the tap holder 106 through the rollers 109.

When the load torque on the holder 106 exceeds a predetermined torque value, the rollers 109 are forced by the torque reaction force out of the grooves 104 (FIG. 8), allowing the spindle 101 to idle and the holder 106 to stop rotating. The rollers 109 press the edges of the grooves 122 to rotate the annular memeber 120 until the grooves 122 are aligned with the slots 108 so that the rollers move into the grooves 122. This causes the holes 121 of the annular member 120 to be displaced from the recesses 110 of the driven member 106, lifting the balls 111 away from the recesses 110 against the force of the spring 127.

When the load torque becomes lower than the predetermined value, the force of the spring 127 pressing on the balls 111, which are always in engagement with both the holes 121 and the recesses 110, then causes the parts to return to the position of FIG. 7.

The predetermined torque may be adjusted by detaching the holder 106 from the spindle 101 and then turning the screw 125 to change the compressive force of the spring 127 and/or replacing the annular member 103 with one having a different inner diameter or grooves 104 of different sizes.

Each clutch roller 4 (FIG. 9) or 109 (FIG. 5) may be replaced by a plurality of balls.

FIG. 9 shows the third embodiment as applied between driving and driven gear systems. Two sprocket members 1' and 51, one being the driver and the other being driven, are rotatably supported coaxially by radial bearings 54 and 55 on frames 52 and 53, respectively, and spaced axially from each other. Each sprocket member meshes with a sprocket. A shaft 8', corresponding to the tap holder 8 in FIGS. 1-4, is angularly fixed within a bore 62 of the member 51 by keys 63 and extends into a bore 64 of the member 1' to normally transmit rotational torque between the members 1' and 51. The parts given numerals with a prime mark correspond to the parts in FIGS. 1-4 of the same numerals without the prime mark.

Figure 10:
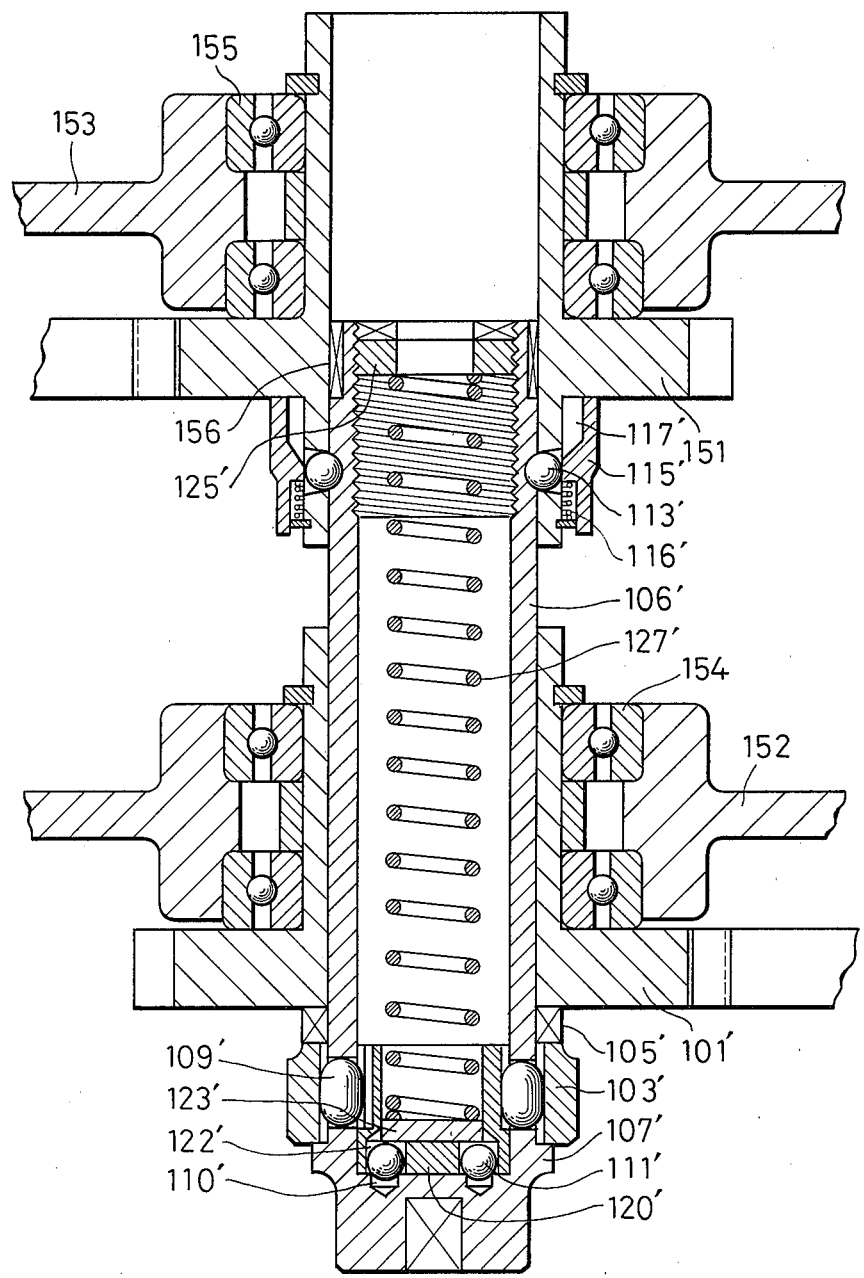
FIG. 10 is a side view similar to FIGS. 1, 5 and 9 but showing a fourth embodiment in its normal position.

FIG. 10 shows the fourth embodiment also applied between two gear systems. Two sprocket members 101' and 151 are rotatably supported coaxially by radial bearings 154 and 155 on frames 152 and 153, respectively, and axially spaced from each other. A shaft 106' corresponding to the holder 106 in FIGS. 5-8 is angularly fixed within a bore of the member 151 by keys 156 and extends into a bore of the member 101'. The parts given numerals with the prime mark correspond to the parts in FIGS. 5-8 of the same numerals without the prime mark.

Figure 1:
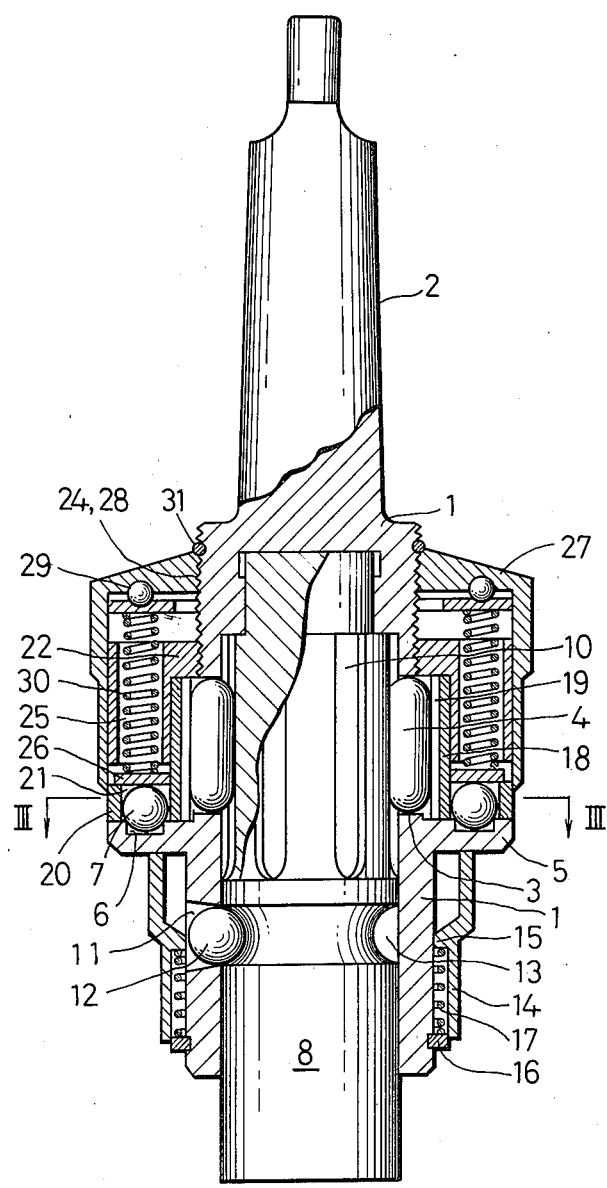
FIG. 1 is a side view partly in axial section, of a torque limiter according to a first embodiment of this invention in its normal position.

Thus, in the embodiment of the invention shown in FIGS. 1 to 4, when the torque limiter is in its driving position shown in FIGS. 1 and 3, the rollers 4 extend into the grooves 10 and are engaged by the corners of the grooves 19, and the holes 21 are aligned with the recesses 6. The corners of the grooves 10 and 19 engage only relatively small arcs on the rollers and thereby exert outward and inward forces on the rollers. The recesses 6 also only engage relatively small arcs of the balls 7 and therefore exert upward forces on them. The foregoing operation is also typical of the other embodiments of the invention.

What is claimed is:

1. A torque limiter comprising first and second rotational members arranged coaxially with and rotatable relative to each other, the first member having at least one axial groove formed therein, the second member having a cylindrical portion formed with at least one axial slot therethrough, an annular member positioned radially opposite the first member across from the second member, said annular member being rotatable relative to each rotational member and having at least one axial groove formed therein and at least one axial hole formed therethrough with its axis offset from the axis of the tubular member, a roller in movable engagement with both the slot of the second member and the groove of the tubular member and engageable with the groove of the first member, the second member further having at least one axial recess formed therein with its axis eccentric from the axis of the second member, a ball in movable engagement with both the hole of the tubular member and the recess of the second member and spring-urged into the recess to angularly align the hole and recess with each other, the angular relationship among said axial grooves, hole and recess being such that, when the hole and recess are in angular alignment, the groove of the tubular member and the slot of the second member are angularly displaced from each other forcing the roller from the groove of the tubular member into the groove of the first member through the slot but keeping the roller angularly within the groove of the tubular member and, when the slot of the second member and the groove of the tubular member are in angular alignment so that the roller can leave the groove of the first member and move into the groove of the tubular member, the recess and the hole are angularly displaced from each other, thereby forcing the ball away from the recess against the spring-urging but keeping it angularly within the recess.

2. A torque limiter as claimed in claim 1, said groove of said first member being an outer groove, said cylindrical portion of said second member rotatably surrounding said first member, said annular member rotatably surrounding said cylindrical portion, said groove of said annular member being an inner groove, said second member having an outer flange in which said recess is formed.

3. A torque limiter as claimed in claim 2 and further comprising an adjusting member threaded outside said second member to adjust said spring-urging.

4. A torque limiter as claimed in claim 1, said first member having a cylindrical portion rotatably surrounding said cylindrical portion of said second member, said groove of said first member being an inner groove, said annular member being rotatable within said cylindrical portion of said second member, said groove of said annular member being an outer groove.

5. A torque limiter as claimed in claim 4 and further comprising an adjusting screw threaded inside said cylindrical portion of said second member to adjust said spring-urging.

6. A torque limiter as claimed in claim 4 or 5, wherein said cylindrical portion of said first member is divided into a main part and a replaceable part rotatable together with said main part, said inner groove being formed in said replaceable part.

* * * * *